(12) United States Patent
Steely, Jr. et al.

(10) Patent No.: US 9,146,871 B2
(45) Date of Patent: Sep. 29, 2015

(54) RETRIEVAL OF PREVIOUSLY ACCESSED DATA IN A MULTI-CORE PROCESSOR

(75) Inventors: Simon C. Steely, Jr., Hudson, NH (US); William C. Hasenplaugh, Boston, MA (US); Joel S. Emer, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 13/995,283

(22) PCT Filed: Dec. 28, 2011

(86) PCT No.: PCT/US2011/067639
§ 371 (c)(1),
(2), (4) Date: Jun. 18, 2013

(87) PCT Pub. No.: WO2013/100988
PCT Pub. Date: Jul. 4, 2013

(65) Prior Publication Data
US 2014/0215162 A1  Jul. 31, 2014

(51) Int. Cl.
*G06F 13/00* (2006.01)
*G06F 12/08* (2006.01)
*G06F 13/38* (2006.01)
*G06F 13/10* (2006.01)

(52) U.S. Cl.
CPC ........ *G06F 12/0822* (2013.01); *G06F 12/0817* (2013.01); *G06F 12/0846* (2013.01); *G06F 13/00* (2013.01); *G06F 13/10* (2013.01); *G06F 13/385* (2013.01)

(58) Field of Classification Search
CPC ................................ G06F 13/385; G06F 13/10
See application file for complete search history.

(56) References Cited

U.S. PATENT DOCUMENTS

| | | | |
|---|---|---|---|
| 2004/0059876 A1* | 3/2004 | Nanda et al. | 711/141 |
| 2004/0215900 A1 | 10/2004 | Guthrie et al. | |
| 2011/0004729 A1* | 1/2011 | Akkawi et al. | 711/130 |

OTHER PUBLICATIONS

International Search Report and Written Opinion issued on Apr. 26, 2012, for counterpart International Application No. PCT/US2011/67639.

* cited by examiner

*Primary Examiner* — Zachary K Huson
(74) *Attorney, Agent, or Firm* — Kenyon & Kenyon LLP

(57) ABSTRACT

A multi-core processing apparatus may provide a cache probe and data retrieval method. The method may comprise sending a memory request from a requester to a record keeping structure. The memory request may have a memory address of a memory that stores requested data. The method may further comprise determining a last accessor of the memory address, sending a cache probe to the last accessor, determining the last accessor no longer has a copy of the line; and sending a request for the previously accessed version of the line. The request may bypass the tag-directories and obtain the requested data from memory.

20 Claims, 9 Drawing Sheets

RETRIEVAL OF PREVIOUSLY ACCESSED DATA IN A MULTI-CORE PROCESSOR

FIELD OF THE INVENTION

The present disclosure pertains to the field of processors and, in particular, to optimizing cache management techniques.

DESCRIPTION OF RELATED ART

Advances in semi-conductor processing and logic design have permitted an increase in the amount of logic that may be present on integrated circuit devices. As a result, computer system configurations have evolved from a single or multiple integrated circuits in a system to multiple cores that can execute multiple hardware threads in parallel on individual integrated circuits (e.g., individual semiconductor chips). A processor or integrated circuit typically comprises a single physical processor die, where the processor die may include any number of cores that each can execute a respective hardware thread. The ever increasing number of processing elements (e.g., cores)—on integrated circuits enables more tasks to be accomplished in parallel. However, the execution of more threads and tasks put an increased premium on shared resources, such as memory, and the management thereof.

Typically, cache memory includes a memory between a shared system memory and execution units of a processor chip to hold information in a closer proximity to the execution units. In addition, cache is typically smaller in size than a main system memory, which allows for the cache to be constructed from expensive, faster memory, such as Static Random Access Memory (SRAM). Both the proximity to the execution units and the speed allow for caches to provide faster access to data and instructions. Caches are often identified based on their proximity from execution units of a processor. For example, a first-level (L1) cache may be close to execution units residing on the same physical processor chip (e.g., same semiconductor die). Due to the proximity and placement, first level cache is often the smallest and quickest cache. A processor may also hold higher-level or further out caches, such as a second level (L2) cache, which may also reside on the processor chip but be placed between the first level cache and main memory of the computer system. And a third level (L3) cache may be placed on the processor chip or elsewhere in the computer system, such as at a controller hub, between the second level cache and main memory of the computer system.

Cache coherence is a useful mechanism in multi-core processors and multi-processor systems to provide a shared memory abstraction to the programmer. When a multi-core processor or multi-processor system caches a given shared memory location, a cache coherence problem may arise because one copy of the same memory location exists in multiple caches. A cache coherence protocol guarantees that a given memory location has a consistent view across all cores or all processors. There are many models of what a consistent view is, for example, sequential consistency and weak ordering. In each of these models, the coherence protocol prescribes a legal order in which memory locations can be acquired by and updated by various cores.

One conventional technique for maintaining cache coherency, particularly in distributed systems (e.g., a multi-core processor or a multi-processor system), is a directory-based cache coherency scheme. Directory-based coherency schemes utilize a centralized tag directory to record the location and the status of cache lines as they exist throughout the system. For example, the tag directory records which caches have a copy of the data, and further records if any of the caches have an updated copy of the data. When a core makes a read request for a data item, the tag directory is consulted to determine where the most recent copy of the data resides. Based on this information, a data probe is sent to the last core that accessed the data (e.g., the last accessor) and the most recent copy of the cache line is retrieved so that it is provided to the requesting core and saved in a cache line of the requesting core. The tag directory is updated to reflect the new status for that cache line either immediately in parallel with sending out the data probe for the information or is updated after sending out the data probe. The change typically includes updating a last accessor field, so that if another request processes the tag-directory it goes off to the new last accessor, even if the first probe still hasn't even made it to its target. However, in a cache coherency protocol that provides a guarantee that probes sent to a core will be able to find the requested data and be serviced, it is problematic to handle cores that can silently invalidate shared copies of data without notifying any record keeping structure in the protocol system. Typically, the requesting core receives a negative response (e.g., negative acknowledgement (NACK)) indicating the cache line is no longer available and the request must start over again. Therefore, there is a need in the art to provide a data service command in a cache coherency protocol that can find the data and service the probe without starting over even if the probed core has invalidated the cache line.

DESCRIPTION OF THE FIGURES

Embodiments are illustrated by way of example and not limitation in the Figures of the accompanying drawings.

DETAILED DESCRIPTION

Figure 1A:
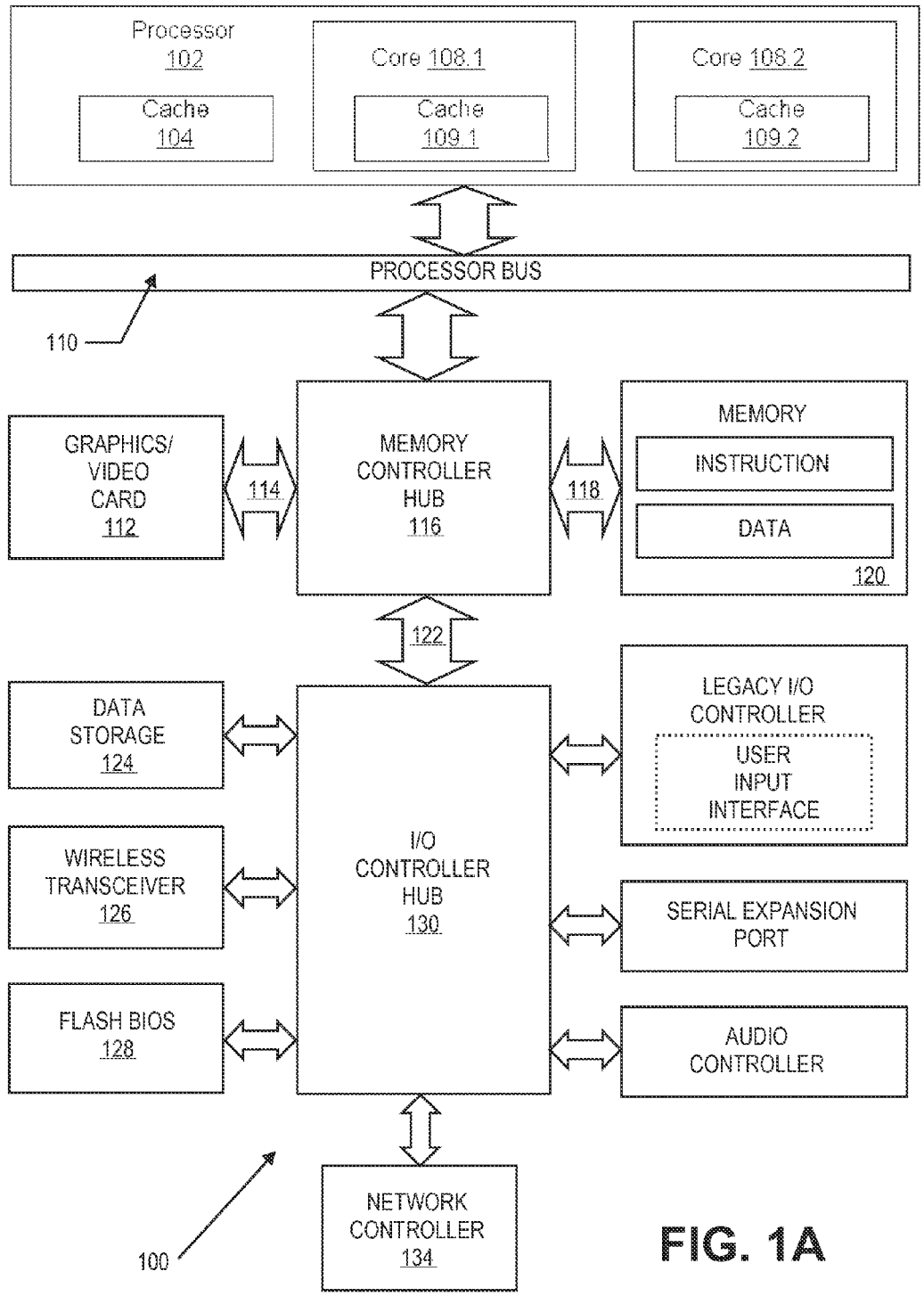
FIG. 1A is a block diagram of a system according to one embodiment.

The following description describes an instruction and processing logic to perform a one time read prior (OTRprior) command within or in association with a processor, computer system, or other processing apparatus. In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

One embodiment of the present invention may provide a multi-core processor. The multi-core processor may implement a cache probe and data retrieval method. The method may comprise sending a memory request from a requester to a record keeping structure. The memory request may have a memory address of a memory that stores requested data. The method may further comprise determining a last accessor of the memory address, sending a cache probe to the last accessor, determining the last accessor no longer has a copy of the line and sending a request for the previously accessed version of the line which bypasses the tag-directories and obtains the requested data from memory.

In one or more embodiments, a cache may store quantities of data called cache lines or cache blocks. The term cache line and cache block may be used interchangeably. In one embodiment, a cache line may be composed of two main parts: metadata (or tag) and data. Each metadata entry may identify the contents of the corresponding data entry. The metadata may include status information that may include a validity bit indicating whether the data in the corresponding cache line is valid.

The cache line and its underlying parts or fields such as the data field may be of any size. In one embodiment, the size of cache lines may be consistent in a cache structure, and the data size may be fixed at 64 bytes. When a request for a data item smaller than 64 bytes, for example an 8-byte data item, misses the cache, a new line of 64 bytes may be allocated and 64 bytes of data (including the requested 8-byte data) are returned and filled into the cache. This is because most programs have spatial locality and the other 56 bytes of the line have a good probability of being accessed. However, some data structures are accessed sparsely, and demonstrate no spatial locality. In these situations only the 8 bytes of the request need to be returned because the other 56 bytes will not be accessed and it is a waste of energy to move them around.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may be a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system 100 formed with a processor 102 that includes one or more cores 108 (e.g., cores 108.1 and 108.2). Each core 108 may execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment of the system 100 may be described in the context of a single processor desktop or server system, but alternative embodiments can be included in a multiprocessor system. System 100 may be an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. In one embodiment, the processor 102 may include a Level 2 (L1) internal cache memory 104 and each core (e.g., 108.1 and 108.2) may include a Level 1 (L1) cache (e.g., 109.1 and 109.2, respectively). In one embodiment, the processor 102 may be implemented in one or more semiconductor chips. When implemented in one chip, all or some of the processor 102's components may be integrated in one semiconductor die.

Each of the core 108.1 and 108.2 may also include respective register files (not shown) that can store different types of data in various registers including integer registers, floating point registers, status registers, and instruction pointer register. Each core 108 may further include logic to perform integer and floating point operations.

The processor 102 also includes a microcode (ucode) ROM that stores microcode for certain macroinstructions. For one embodiment, each core 108 may include logic to handle a packed instruction set (not shown). By including the packed instruction set in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of the processor 102 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
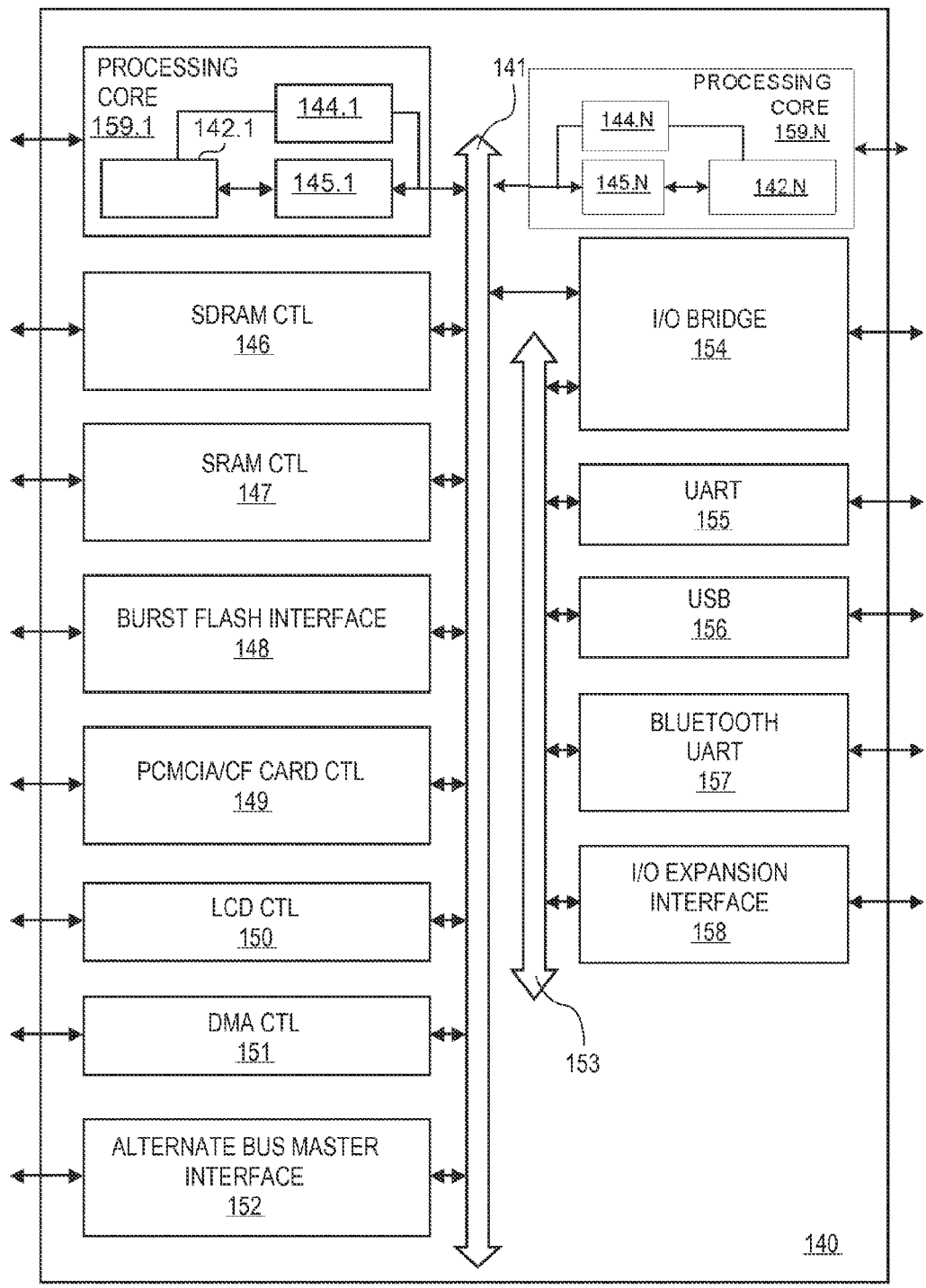
FIG. 1B is a block diagram of a processor according to one embodiment.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention. In one embodiment, the data processing system 140 may be a system on a chip and all components of the data processing system 140 may be integrated on one semiconductor chip.

Computer system 140 comprises multiple processing cores 159 (e.g., 159.1 to 159.N, N may be an integer larger than one) that each may be capable of performing at least one instruction in accordance with one embodiment. For one embodiment, a processing core 159 may represent a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Each processing core 159 may comprise an execution unit 142 (e.g., 142.1 to 142.N respectively), a set of register file(s) 145 (e.g., 145.1 to 145.N respectively), and a decoder 144 (e.g., 144.1 to 144.N respectively). Each processing core 159 may also include additional circuitry (not shown) which is not necessary to the understanding of embodiments of the present invention. Each execution unit 142 may be used for executing instructions received by the respective processing core 159. In addition to performing typical processor instructions, execution unit 142 can perform instructions in packed instruction set for performing operations on packed data formats. Packed instruction set may include instructions for performing embodiments of the invention and other packed instructions. Each execution unit 142 may be coupled to register file 145 by a bus internal of the respective core 159. Each register file 145 may represent a storage area on a respective processing core 159 for storing information, including data. As previously mentioned, it is understood that the storage area used for storing the packed data is not critical. Each execution unit 142 may be coupled to a respective decoder 144 of the respective core 159. Each decoder 144 may be used for decoding instructions received by the respective processing core 159 into control signals and/or microcode entry points. In response to these control signals and/or microcode entry points, each execution unit 142 performs the appropriate operations. In one embodiment, the decoder may be used to interpret the opcode of the instruction, which will indicate what operation should be performed on the corresponding data indicated within the instruction.

Each processing core 159 may be coupled, respectively, with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PC-MCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and multiple processing cores 159 capable of performing SIMD operations including a text string comparison operation. Each processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 2:
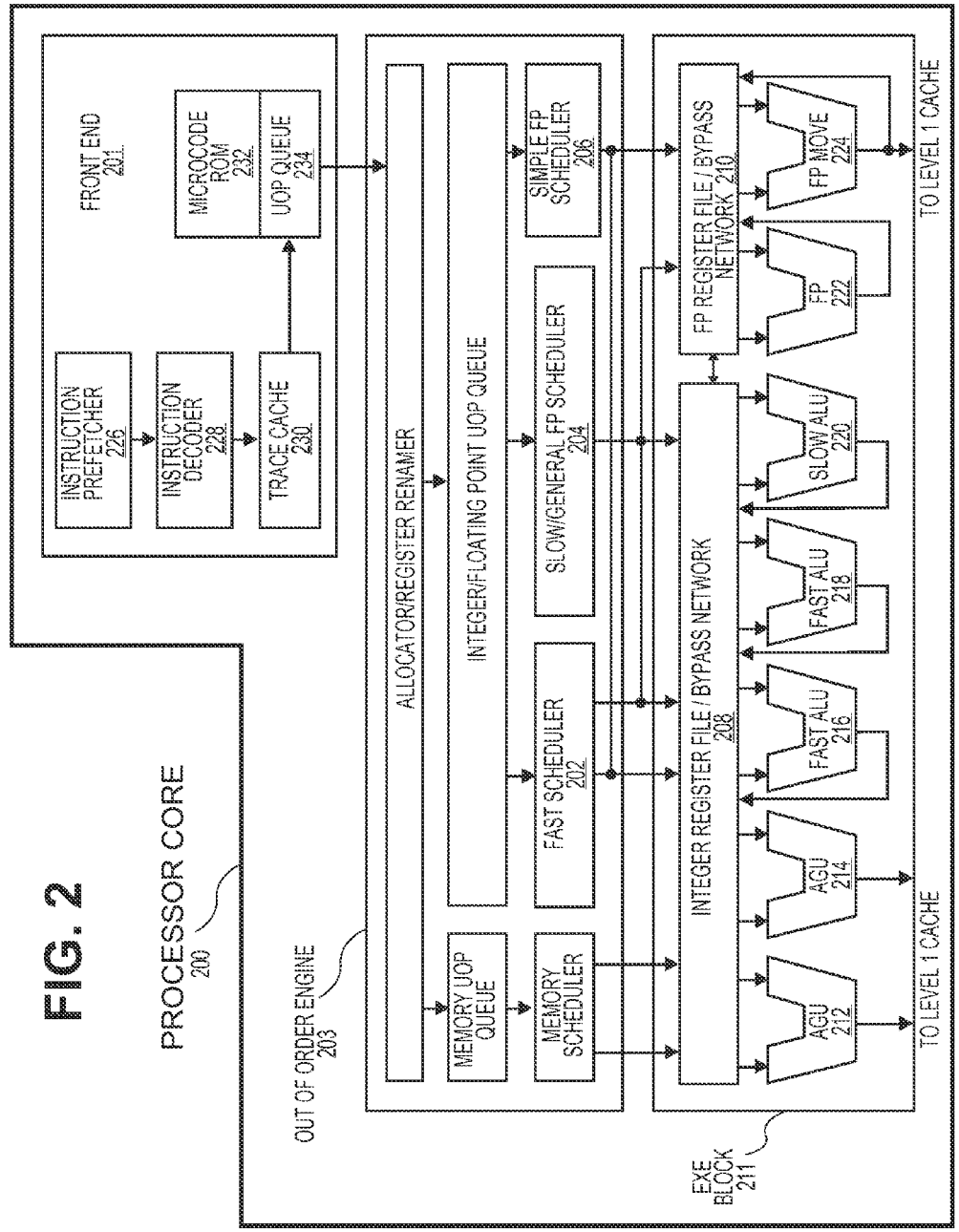
FIG. 2 is a block diagram of a processor core according to one embodiment.

FIG. 2 is a block diagram of the micro-architecture for a processor core 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 201 is the part of the processor core 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor core 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor core 200, the processor core 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
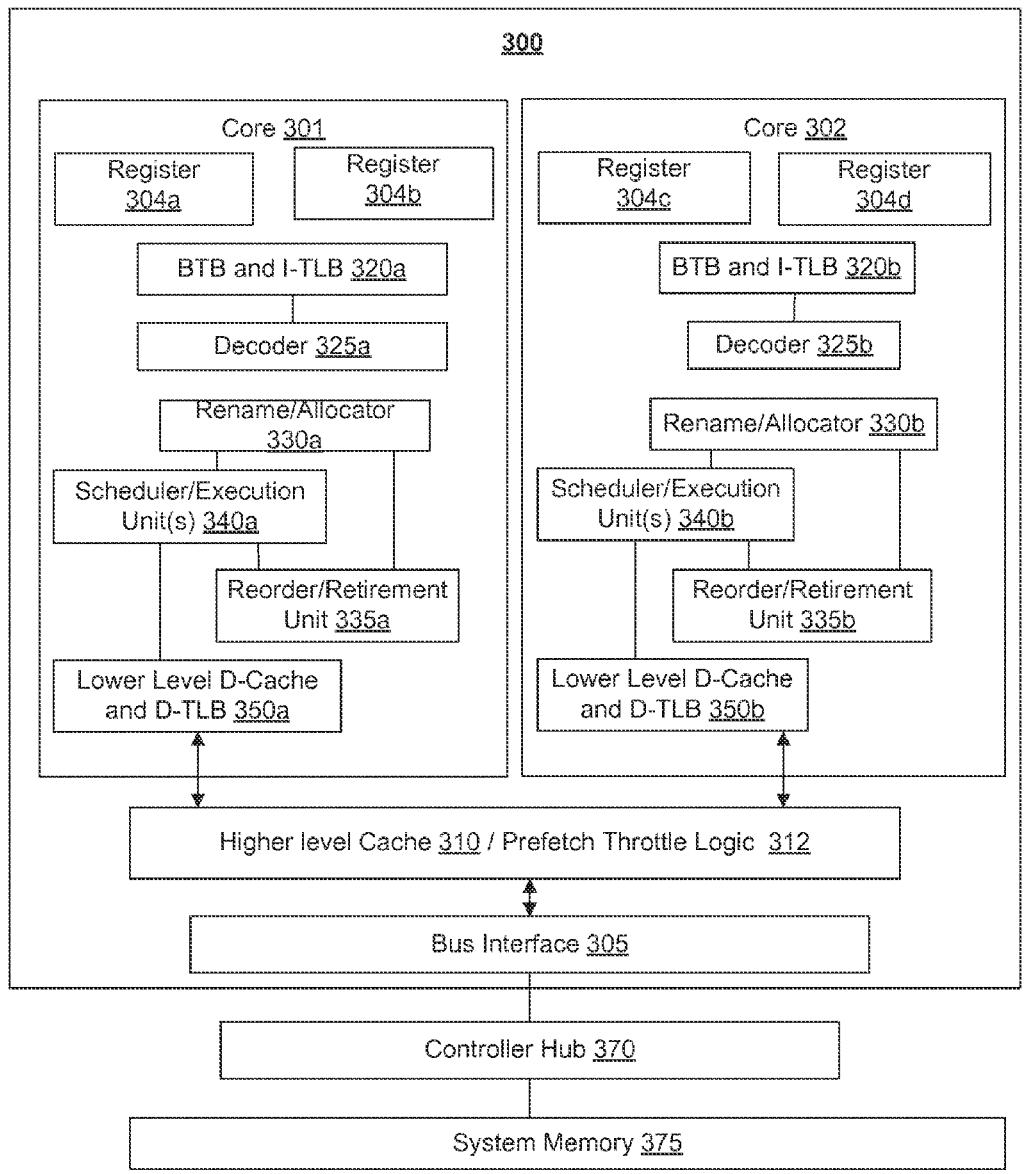
FIG. 3 is a block diagram of a multi-core processor according to one embodiment.

Referring to FIG. 3, an embodiment of a processor including multiple cores is illustrated. Processor 300, in one embodiment, includes one or more level of caches. Processor 300 may be any processor, such as a micro-processor, an embedded processor, a digital signal processor (DSP), a network processor, or other device to execute code. Processor 300, as illustrated, includes a plurality of processing elements. In one embodiment, the processor 300 may be implemented in one or more semiconductor chips. When implemented in one chip, all or some of the processor 300's components may be integrated in one semiconductor die.

In one embodiment, a processing element may refer to a thread unit, a thread slot, a process unit, a context, a logical processor, a hardware thread, a core, and/or any other element, which is capable of holding a state for a processor or a core, such as an execution state or architectural state. In other words, a processing element, in one embodiment, refers to any hardware capable of being independently associated with code, such as a software thread, operating system, application, or other code. In an embodiment, a physical processor may refer to an integrated circuit, which potentially includes any number of other processing elements, such as cores or hardware threads.

A core may refer to logic located on an integrated circuit capable of maintaining an independent architectural state wherein each independently maintained architectural state is associated with at least some dedicated execution resources. In contrast to cores, in an embodiment, a hardware thread may refer to any logic located on an integrated circuit capable of maintaining an independent architectural state wherein the independently maintained architectural states share access to execution resources. In some embodiments, when certain resources are shared and others are dedicated to an architectural state, the line between the nomenclature of a hardware thread and core overlaps. Yet often, a core and a hardware thread may be viewed by an operating system as individual logical processors, where the operating system is able to individually schedule operations on each logical processor.

Physical processor 300, as illustrated in FIG. 3, includes two cores, core 301 and 302. In an embodiment, core hopping may be utilized to alleviate thermal conditions on one part of a processor. However, hopping from core 301 to 302 may potentially create the same thermal conditions on core 302 that existed on core 301, while incurring the cost of a core hop. Therefore, in one embodiment, processor 300 includes any number of cores that may utilize core hopping. Furthermore, power management hardware included in processor 300 may be capable of placing individual units and/or cores into low power states to save power. Here, in one embodiment, processor 300 provides hardware to assist in low power state selection for these individual units and/or cores.

Although processor 300 may include asymmetric cores, i.e. cores with different configurations, functional units, and/or logic, symmetric cores are illustrated. As a result, core 302, which is illustrated as identical to core 301, will not be discussed in detail to avoid repetitive discussion. In addition, each of core 301 and core 302 may include two sets of registers (e.g., 304a and 304b, 304c and 304d, respectively). Each set of register may support a respective hardware thread. Therefore, software entities, such as an operating system, potentially view processor 300 as four separate processors, i.e. four logical processors or processing elements capable of executing four software threads concurrently.

Here, a first thread may be associated with architecture state registers 304a, a second thread may be associated with architecture state registers 304b, a third thread may be associated with architecture state registers 304c, and a fourth thread may be associated with architecture state registers 304d. As illustrated, in the core 301, individual architecture states/contexts may be capable of being stored for logical processors in architecture state registers 304a and 304b, respectively.

As shown in FIG. 3, each core 301 and 302 may have a respective rename/allocator logic 330a and 330b. In an embodiment, each rename/allocator logic 330 may have a set of instruction pointers and renaming logic for each hardware thread supported by a core (e.g., the rename/allocator logic 330a may have two sets of instruction pointers and renaming logic corresponding to the registers 304a and 304b).

Processor 300 often includes other resources, which may be fully shared, shared through partitioning, or dedicated by/to processing elements. In FIG. 3, an embodiment of a purely exemplary processor with illustrative logical units/resources of a processor is illustrated. Note that a processor may include, or omit, any of these functional units, as well as include any other known functional units, logic, or firmware not depicted. As illustrated, each core of the processor 300 includes a branch target buffer (BTB) and an instruction-translation buffer (I-TLB) 320 (e.g., 320a and 320b for the cores 301 and 302 respectively). The BTB may predict branches to be executed/taken and the I-TLB may store address translation entries for instructions.

Some resources, such as re-order buffers in reorder/retirement unit 335a and 335b, I-LTB, load/store buffers, and queues may be shared by two hardware threads of a core through partitioning. Other resources, such as general purpose internal registers, page-table base register, low level data-cache and data-TLB 150a and 150b, scheduler/execution unit(s) 140a and 140b, and portions of out-of-order unit of the reorder/retirement unit 335a and 335b may be potentially fully shared by two hardware threads (corresponding to the two registers 304a and 304b, or 304c and 304d) of a core.

Each core of the processor 300 further includes a respective decode module (e.g., 325a and 325b) coupled to a fetch unit of the respective BTB and I-TLB 320 to decode fetched elements. In one embodiment, processor 300 may be associated with an Instruction Set Architecture (ISA), which defines/specifies instructions executable on processor 300. Here, often machine code instructions recognized by the ISA include a portion of the instruction referred to as an opcode, which references/specifies an instruction or operation to be performed.

In one example, each allocator and renamer block 330 includes an allocator to reserve resources, such as register files to store instruction processing results. However, threads maintained by the two registers (e.g., 304a and 304b) may be potentially capable of out-of-order execution, where the allocator and renamer block 330 also reserves other resources, such as reorder buffers to track instruction results. Further, the allocator and renamer block 330 may also include a register renamer to rename program/instruction reference registers to other registers internal to processor 300. Each reorder/retirement unit (e.g., 335a and 335b) includes components, such as the reorder buffers mentioned above, load buffers, and store buffers, to support out-of-order execution and later in-order retirement of instructions executed out-of-order.

Each scheduler and execution unit(s) block (e.g., 340a and 340b), in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 350a and 350b may be coupled to respective scheduler/execution unit(s) 340 in a respective core. The data cache may store recently used/operated on elements, such as data operands, which are potentially held in memory coherency states. The D-TLB may store recent virtual/linear to physical address translations. As a specific example, a processor may include a page table structure to break physical memory into a plurality of virtual pages.

As depicted, cores 301 and 302 share access to higher-level or further-out cache 310, which is to cache recently fetched elements. Note that higher-level or furtherout refers to cache levels increasing or getting further way from the execution unit(s). In one embodiment, higher-level cache 310 is a last-level data cache—last cache in the memory hierarchy on processor 300—such as a second or third level data cache. However, higher level cache 310 is not so limited, as it may be associated with or include an instruction cache. A trace cache—a type of instruction cache—instead may be coupled after decoder 325 to store recently decoded traces.

Note, in the depicted configuration that processor 300 also includes bus interface module 305 to communicate with devices external to processor 300, such as a controller hub 370 and system memory 375. The controller hub 370 may be part of a chipset, a northbridge, or other integrated circuit. Memory 375 may be dedicated to processor 300 or shared with other devices in a system. Common examples of types of memory 375 include dynamic random access memory (DRAM), static RAM (SRAM), non-volatile memory (NV memory), and other known storage devices.

FIG. 3 illustrates an abstracted, logical view of an exemplary processor with a representation of different modules, units, and/or logic. However, note that a processor utilizing the methods and apparatus' described herein need not include the illustrated units. And, the processor may omit some or all of the units shown.

Figure 4:
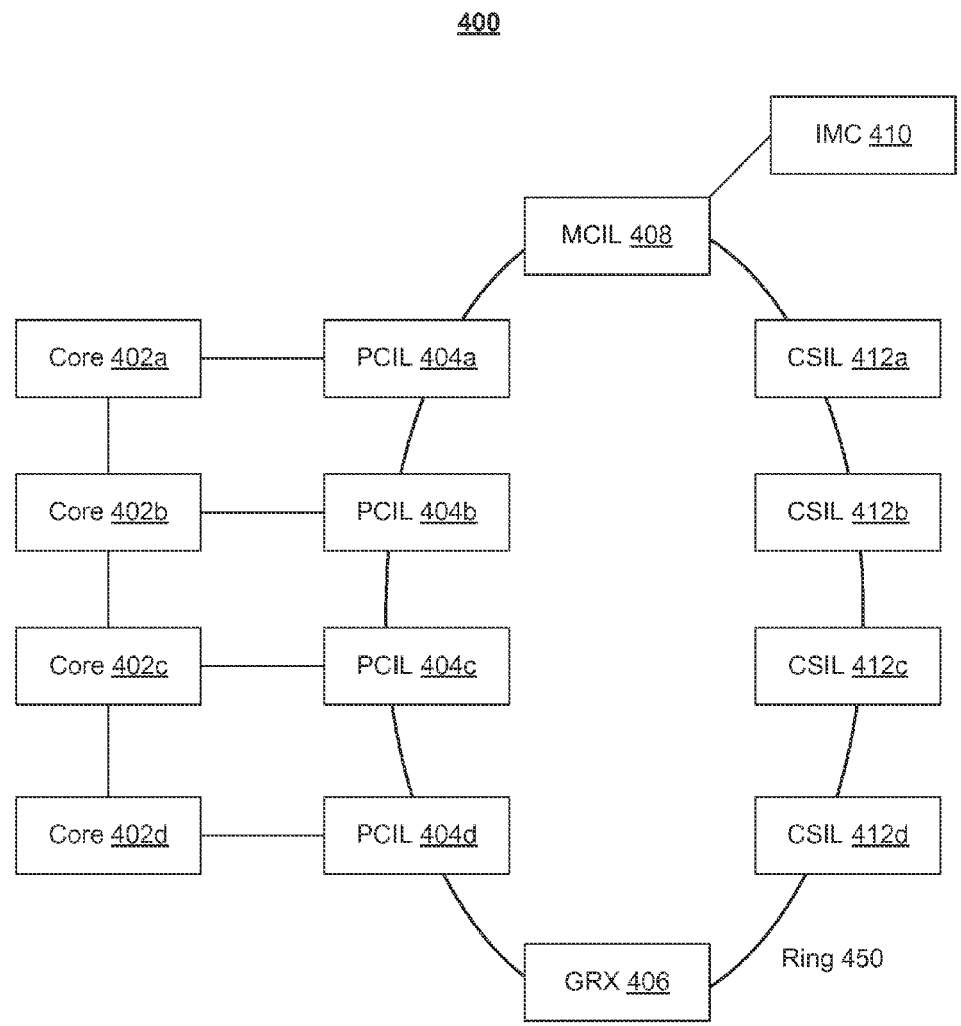
FIG. 4 is a block diagram of a multi-core processor according one embodiment.

To illustrate the potential for a different configuration, the discussion now turns to FIG. 4, which depicts an embodiment of processor 400 including an on-processor memory interface module—an uncore module—with a ring configuration to interconnect multiple cores. Processor 400 is illustrated including a physically distributed cache; a ring interconnect; as well as core, cache, and memory controller components. However, this depiction is purely illustrative, as a processor implementing the described methods and apparatus may include any processing elements, style or level of cache, and/or memory, front-side-bus or other interface to communicate with external devices. In one embodiment, the processor 400 may be implemented in one or more semiconductor chips. When implemented in one chip, all or some of the processor 400's components may be integrated in one semiconductor die.

In one embodiment, caching agents 412a, 412b, 412c and 412d are each to manage a slice of a physically distributed cache. As an example, each cache component, such as component 412a, is to manage a slice of a cache for a collocated core 402a—a core the cache agent is associated with for purpose of managing the distributed slice of the cache. As depicted, cache agents 412a, 412b, 412c and 412d are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) for each cores 402a, 402b, 402c and 402d.

Much like cache agents handle traffic on ring interconnect 450 and interface with cache slices, core agents/components 404a, 404b, 404c and 404d are to handle traffic and interface with cores 402a, 402b, 402c and 402d, respectively. As depicted, core agents 404a, 404b, 404c and 404d may be referred to as Processor Core Interface Logic (PCIL)s; they may also be referred to as core components, agents, or other known logic, units, or modules for interfacing with a processing element. Additionally, ring 450 is shown as including Memory Controller Interface Logic (MCIL) 408 and Graphics Hub (GFX) 406 to interface with other modules, such as memory controller (IMC) 410 and a graphics processor (not illustrated). However, ring 450 may include or omit any of the aforementioned modules, as well as include other known processor modules that are not illustrated. Additionally, similar modules may be connected through other known interconnects, such as a point-to-point interconnect or a multi-drop interconnect.

It's important to note that the methods and apparatus' described herein may be implemented in any cache at any cache level, or at any processor or processor level. Furthermore, caches may be organized in any fashion, such as being a physically or logically, centralized or distributed cache. As a specific example, the cache may include a physical centralized cache with a similarly centralized tag directory. For example, the higher level cache 310 of FIG. 3 may include a tag directory. Alternatively, the tag directories may be either physically and/or logically distributed in a physically distributed cache, such as the cache organization illustrated in FIG. 4.

Figure 5:
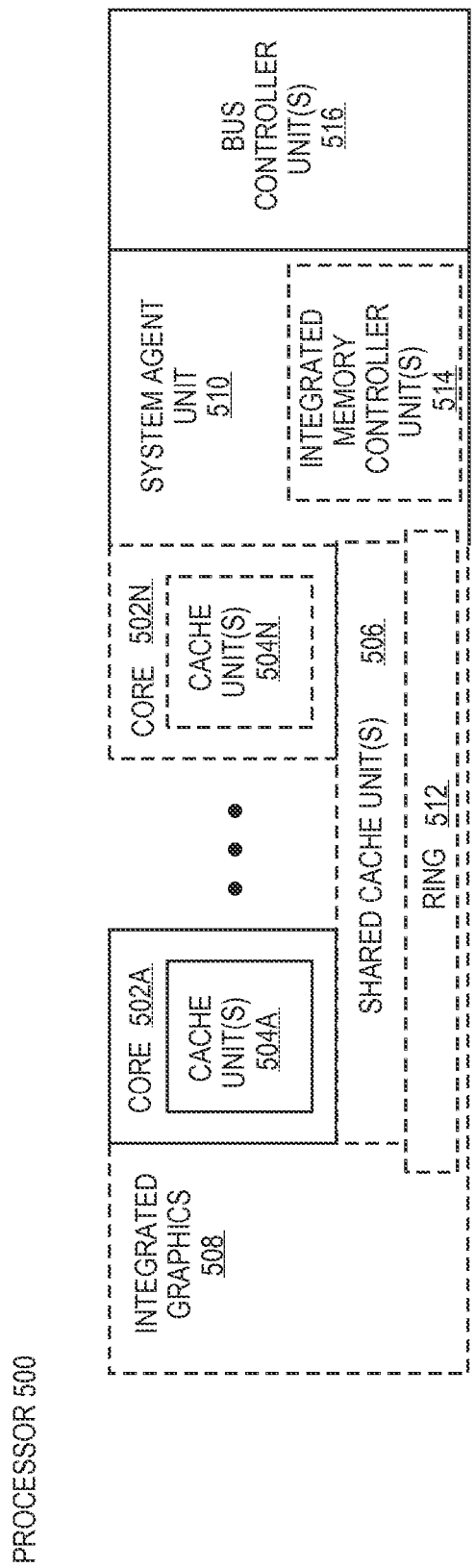
FIG. 5 is a block diagram of a multi-core processor according to one embodiment.

FIG. 5 is a block diagram of a multicore processor 500 with integrated memory controller and graphics according to embodiments of the invention. FIG. 5 illustrate a processor 500 with multiple cores 502A-N (N being an integer larger than one), a system agent 510, a set of one or more bus controller units 516, a set of one or more integrated memory controller unit(s) 514 in the system agent unit 510, and an integrated graphics logic 508.

The memory hierarchy includes one or more levels of cache 504A-N within the cores respectively, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor 500 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor 500 may be implemented on one or more chips. The processor 500 may be a part of and/or may be implemented on one or more substrates using any of a number of process technologies, such as, for example, BiCMOS, CMOS, or NMOS.

Figure 6:
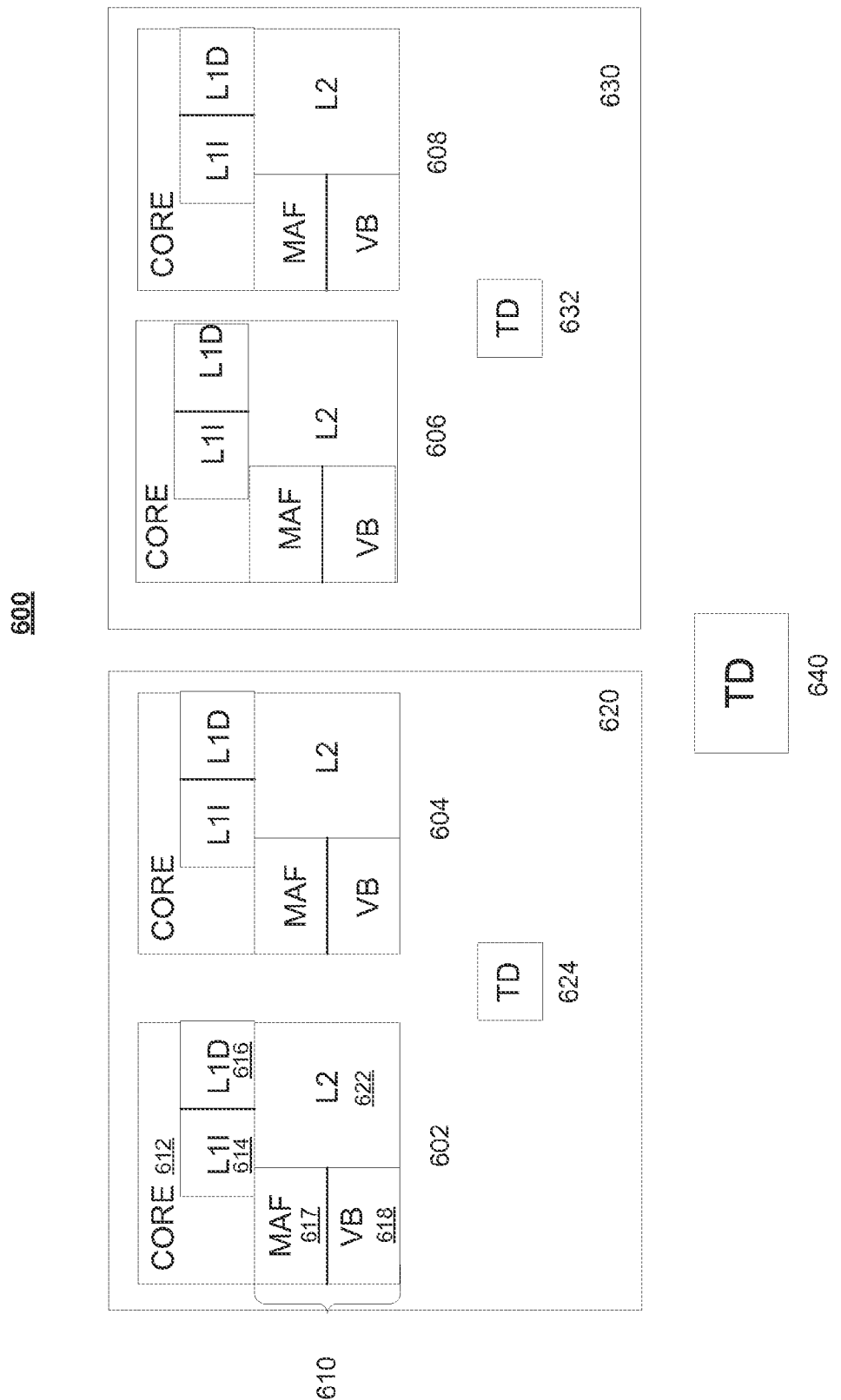
FIG. 6 is a block diagram of a plurality of cores of a multi-core processor according to one embodiment.

In an embodiment, a processor, such as the processor illustrated in FIGS. 3, 4, and 5, or any other processor, includes one or more caches. FIG. 6 illustrates an embodiment of a processing system 600 with multiple processing units (602, 604, 606, and 608). In one embodiment, the processing system 600 may be implemented in one or more semiconductor chips. When implemented in one chip, the processing system 600 may be a multi-core processor and all or most of the processing system 600's components may be integrated in one semiconductor die.

Each processing unit (602, 604, 606, or 608) may include a core 612 and an uncore 610 (although only components of the processing unit 602 are labeled with reference numerals, these components are identical for the processing units 604, 606 and 608 and are not repeated for those three processing units). In an embodiment, 602, 604, 606, and 608 may be cores/uncores which are part of a single processor. In another embodiment, 602, 604, 606, and 608 may be multiple processors on a single chip (e.g., integrated circuit die). The core 612 may include components of a processing unit involved in executing instructions. The uncore 610 may include the functions of a processing unit that are not in the core 612, but which are essential for core performance. The core 612 may include components such as an L1 instruction cache (LH) 614 and a L1 data cache (L1D) 616. The uncore 610 may include components such as a miss address file (MAF) 617, victim buffer (VB) 618, and L2 cache (L2) 622.

The MAF structure 617 may be used to keep a record of all requests (except victims) outstanding to the rest of the hierarchy. When a request (such as a read request (Rd)) misses the L2 cache then a MAF entry may be allocated to keep track of the progress of the Rd request until it completes. An additional function the MAF provides may be making sure two requests for the same address (e.g., from the same requester) are not issued into the hierarchy, since it can be examined (searched or cammed) to see if there is already an entry for the address and not allow a second entry to be created with the same address as a prior one. The MAF may also be a key member of handling processing of interactions between two requests (e.g., from two different requesters) accessing the same line near the same time. When probes arrive at the MAF after a message indicating what the original requester needs to wait for before proceeding with further actions, for example, an order-marker (om), the probes may be stored in the MAF and processed when the corresponding request of the MAF is completed. Invalidation and back invalidation (Inval and Back-Inval) actions arriving after the order-marker may also be stored in the MAF.

The VB (Victim Buffer) structure 618 may be used to handle evictions from the L2 and make sure they interact with the rest of the protocol correctly. Both clean and dirty (modified) lines may be placed into the VB as they are evicted from the L2. The victim process with the protocol may be a three-hop approach that allows the L2 to hit on the line while it is in the VB and return it into the L2. In an embodiment, a silent eviction does not create a victim buffer entry, but may just invalidate the data.

One or more processing units, one or more cores, or one or more uncores, and their caches may be associated with a domain. In an embodiment, illustrated in FIG. 6, processing units 602 and 604, and their cores, uncores, and caches may be associated with a domain 620. A tag directory (TD) 624 may keep track of data in caches in domain 620. Similarly, processing units 606 and 608, and their cores, uncores, and caches may be associated with a domain 630. A TD 632 may keep track of data in caches in domain 630. A TD 640 may keep track of data in caches in multiple domains 620 and 630. In other words, the TD structure may be a hierarchy, where TD 624 and TD 632 are on one level of the hierarchy and TD 640 is on the next level. Although only two levels in a TD hierarchy have been illustrated in FIG. 6, other embodiments may include any number of levels in a TD hierarchy.

If a request for a cache line misses the L1D cache 616, the request may check for the same cache line in the L2 cache 622. If the cache line is not in the L2 cache 622, then the request may continue to check the TD 624 to find out whether the cache line is located in one of the caches controlled by the neighboring cores in the same domain 620 (i.e., the caches in 604). Even if a copy of the cache line is found in a neighboring cache in the same domain 620, there may be other copies of the cache line in other domains (for example, domain 630), which must be accounted for from a cache coherence perspective. Therefore, the request may need to continue to the TD 640, and check if any other domains also have a copy of the cache line. With a hierarchical tag directory structure as shown in FIG. 6, it may be advantageous (with regards to reducing energy and latency) to resolve requests for cache lines by only accessing the local domain (for example, 624) without accessing other domains (for example, 632 and 640).

In an embodiment, a core of the processor 600 requesting data may probe the TDs to determine if the requested data has already been accessed by another core in the same domain or another domain. The core last accessed the requesting data may be referred to as the last-accessor and the core requesting the data may be referred to as the original requester. If the last accessor and the original requester are in the same domain, only the local TD need to be probed and updated. If the last accessor and the original requester are in the different domains, the local TDs for the last accessor and the original requester and the TD of the next level may all need to be probed and updated.

A processor according to an embodiment of the present invention may use a MOESI cache coherency protocol. MOESI may stand for Modified, Owned, Exclusive, Shared and Invalid states. Modified state (e.g., M-state) for a cache line may mean that the cache line holds the most recent, correct copy of the data. The copy in main memory is stale (incorrect), and no other processor or core holds a copy. The cached data may be modified at will. The cache line may be changed to the Exclusive state by writing the modifications back to main memory. Modified cache lines must respond to a snoop request with data.

A cache line in the owned state (e.g., O-state) may hold the most recent, correct copy of the data. The owned state is similar to the shared state in that other processors or cores can hold a copy of the most recent, correct data. The copy in main memory can be stale (incorrect). Only one processor or core can hold the data in the owned state—all other processors or cores must hold the data in the shared state. The cache line may be changed to the Modified state after invalidating all shared copies, or changed to the Shared state by writing the modifications back to main memory. Owned cache lines must respond to a snoop request with data.

A cache line in the exclusive state (e.g., E-state) may hold the most recent, correct copy of the data. The copy in main memory is also the most recent, correct copy of the data. No other processor or core holds a copy of the data. The cache line may be changed to the Modified state at any time in order to modify the data. It may also be discarded (changed to the Invalid state) at any time. Exclusive cache lines may respond to a snoop request with data.

Shared state (e.g., S-state) for a cache line may mean the cache line holds the most recent, correct copy of the data. Other processors or cores in the system may hold copies of the data in the shared state, as well. The shared cache line may be dirty with respect to memory (if a copy of the cache line exists in the owned state) or it may be clean (if no copy of the cache line exists in the owned state). The cache line may not be written, but may be changed to the Exclusive state after invalidating all shared copies. It may also be discarded (changed to the Invalid state) at any time. A cache line in the invalid state (e.g., I-state) does not hold a valid copy of the data. Valid copies of the data might be either in main memory or another processor or core cache.

In an embodiment, it is possible that an exemplary processor may go into some sort of power saving mode and perhaps turn off half of the cache thereby invalidating all S-state copies of data. If a request is sent by a core for the previously accessed version of the line, the last accessor core may bypass the tag-directories and obtain the requested data from memory. That is, this request for the previously accessed version of the line does not look into the tag-directories to find out where the latest version of the data is, nor does it update the tag-directories since it is dealing with a previously accessed version of the line. In addition, the exemplary processor may implement a cache coherency protocol, which may ensure that anytime a probe is sent to a S-state line, the memory is up to date.

Figure 7:
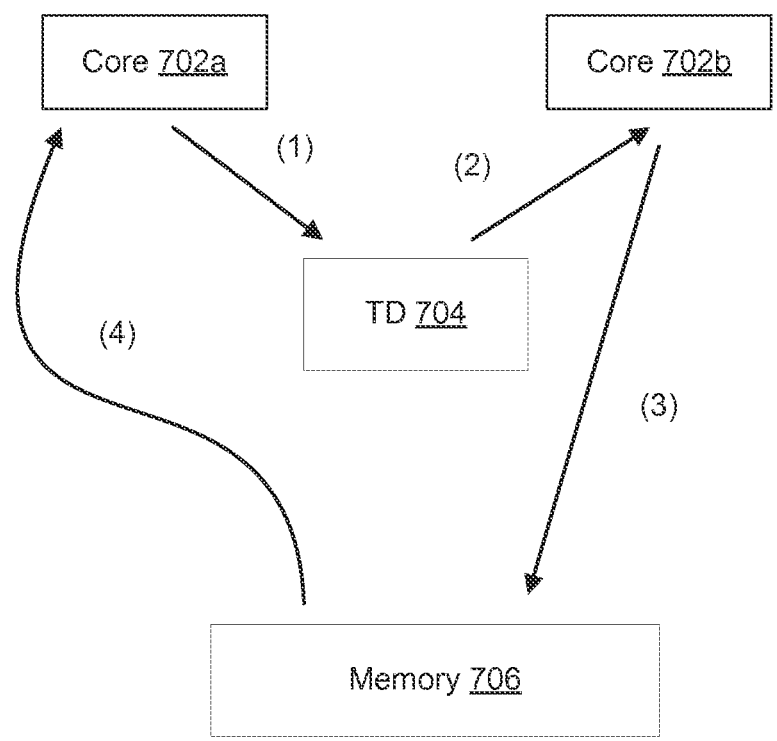
FIG. 7 illustrates elements to perform a cache line probe according to one embodiment.

An exemplary multi-core processor according to the present invention may have a core that can perform "silent invalidation" of clean data (either silently evicting clean lines or because of entering a power save mode, either way without notifying anyone including the record-keeping structures (e.g., various TDs at different levels)). Because the record-keeping structures are not updated, the protocol may send probes to the last-accessor. If the last-accessor is a core that has "silently invalidated" the line, then the line must be shared and more importantly, the data in the main memory must be up to date. An OTRprior (One Time Read Prior) command may be provided in an embodiment. The OTRprior may be sent to the main memory from a last-accessor core when the probe arrives at last-accessor core and the requested data is not found. The OTRprior command may obtain the data from the main memory and return it to the original requester (without any notification to the record-keeping structures that the cache line containing the requested data has been invalidated and the requested data is retrieved from the main memory). FIG. 7 is an illustration of a Read request eventually ending up in an OTRprior completing the operation.

As shown in FIG. 7, a core 702a may send a memory request (e.g., indicated by arrow (1)) for a piece of requested data to a record-keeping structure (e.g., TD 704). The memory request may use a memory address (ADDR) to identify the requested data. According to its records, the record-keeping structure TD 704 may determine the last accessor of ADDR is the core 702(b) and may send a memory probe (e.g., indicated by arrow (2)) to the last-accessor core 702(b) for the piece of requested data. The piece of requested data may be silently-invalidated only if it is in S-state. If the last-accessor is in S-state then the memory 706 must be up-to-date. The last-accessor may issue an OTRprior command (e.g., indicated by arrow (3)) to the memory 706. The OTRprior command will find the value of the line matching the previous access to the line and return a fill (e.g. indicated by arrow (4)) containing that value. In an embodiment, O-state cannot be silently invalidated. Further, in an embodiment, the OTRprior command bypasses all record-keeping structures (e.g., the TD 704).

Figure 8:
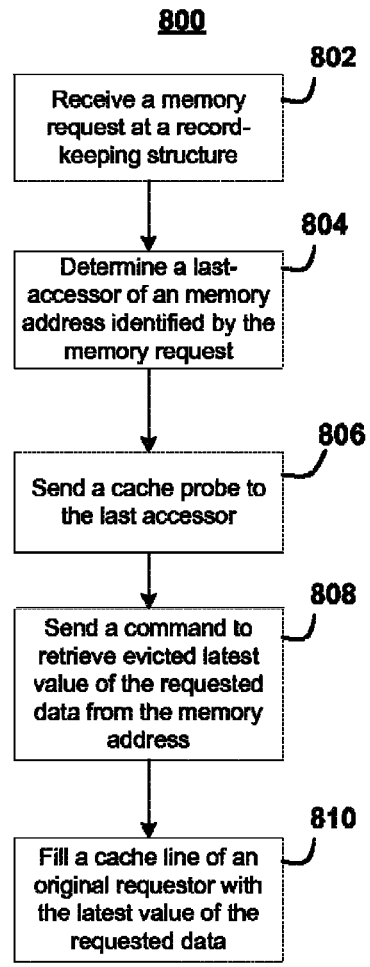
FIG. 8 illustrates a flow diagram for operations of a cache line probe to be performed by a multi-core processor according to one embodiment.

FIG. 8 illustrates a flow diagram of operations to be performed for a process 800 according to one embodiment. The process 800 may start at block 802, at which a memory request may be received at a record-keeping structure. As described above, for example, in a multi-core processor, a core may be an original requester for a piece of requested data. The original requester may send a memory request to a record-keeping structure, such as tag-directories. At block 804, a last-accessor of an memory address identified by the memory request may be determined. For example, the record-keeping structure may check its record to decide whether the memory address has been accessed by another processor or core and thus a copy of the data may already be cached in a cache line in the last-accessor. At block 806, a cache probe may be sent to the last accessor. Then, at block 808, a command to retrieve invalidated latest value of the requested data from the memory address may be sent. For example, as described above, the last-accessor may silently invalidate the cache line holding the latest value of the requested data if the cache line in a S-state. The command may be an OTRprior command that may obtain data from the memory without any notification to the record-keeping structure. At block 810, a cache line of an original requester may be filled with the latest value of the requested data retrieved from the memory. In one embodiment, the record-keeping structure may be updated (e.g., by the original requester) such that the last-accessor may be the original requester from now on.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   a requester to send a memory request, the memory request having a memory address of a memory that stores requested data;
   a record keeping structure to receive the memory request;
   circuitry to determine a last accessor of the memory address;
   circuitry to send a cache probe to the last accessor;
   circuitry to determine the last accessor no longer has a copy of the line; and
   circuitry to send a request for previously accessed version of the line, the request bypassing the tag-directories and obtaining the requested data from memory.

2. The processor of claim 1, wherein the processor is a multi-core processor and the record keeping structure is oblivious that the latest value of the requested data is retrieved from the memory.

3. The processor of claim 2, wherein the requester is a core and the last accessor is another core of the multi-core processor.

4. The processor of claim 3, wherein the requester and last accessor belong to a same processing unit domain of the multi-core processor.

5. The processor of claim 3, wherein the requester and last accessor belong to different processing unit domains of the multi-core processor.

6. The processor of claim 1, wherein the record keeping structure is a tag directory.

7. The processor of claim 1, wherein the record keeping structure is a hierarchy of tag directories.

8. A method comprising:
   sending a memory request from a requester to a record keeping structure, the memory request having a memory address of a memory that stores requested data;
   determining, by the record keeping structure, a last accessor of the memory address;
   sending, by the record keeping structure, a cache probe to the last accessor;
   determining the last accessor no longer has a copy of the line; and
   sending a request for previously accessed version of the line, the request bypassing the tag-directories and obtaining the requested data from memory.

9. The method of claim 8, wherein the requester is a core and the last accessor is another core of a multi-core processor, and the record keeping structure is oblivious that the latest value of the requested data is retrieved from the memory.

10. The method of claim 9, wherein the requester and last accessor belong to a same processing unit domain of the multi-core processor.

11. The method of claim 9, wherein the requester and last accessor belong to different processing unit domains of the multi-core processor.

12. The method of claim 8, wherein the record keeping structure is a tag directory of a multi-core processor.

13. The method of claim 8, wherein the record keeping structure is a hierarchy of tag directories of a multi-core processor.

14. A system comprising:
   a memory;
   a processor coupled to the memory for executing computer instructions stored therein, the processor including:
      a requester to send a memory request, the memory request having a memory address of a memory that stores requested data;
      a record keeping structure to receive the memory request;
      circuitry to determine a last accessor of the memory address;
      circuitry to send a cache probe to the last accessor;
      circuitry to determine the last accessor no longer has a copy of the line; and
      circuitry to send a request for previously accessed version of the line, the request bypassing the tag-directories and obtaining the requested data from memory.

15. The system of claim 14, wherein the processor is a multi-core processor and the record keeping structure is oblivious that the latest value of the requested data is retrieved from the memory.

16. The system of claim 15, wherein the requester is a core and the last accessor is another core of the multi-core processor.

17. The system of claim 16, wherein the requester and last accessor belong to a same processing unit domain of the multi-core processor.

18. The system of claim 16, wherein the requester and last accessor belong to different processing unit domains of the multi-core processor.

19. The system of claim 14, wherein the record keeping structure is a tag directory of a multi-core processor.

20. The system of claim 14, wherein the record keeping structure is a hierarchy of tag directories of a multi-core processor.

* * * * *